(12) United States Patent
Boulanger et al.

(10) Patent No.: US 9,309,008 B2
(45) Date of Patent: Apr. 12, 2016

(54) AIRCRAFT ENGINE MODULE HANDLING ASSEMBLY

(75) Inventors: Pascal Boulanger, Cormeilles en Vexin (FR); Daniel David, Valence en Brie (FR); Thomas Julien Roland Earith, Veneux les Sablons (FR); Jacques Marchand, Machault (FR)

(73) Assignee: SNECMA, Paris (FR)

( * ) Notice: Subject to any disclaimer, the term of this patent is extended or adjusted under 35 U.S.C. 154(b) by 1007 days.

(21) Appl. No.: 13/509,304

(22) PCT Filed: Nov. 19, 2010

(86) PCT No.: PCT/EP2010/067858
§ 371 (c)(1),
(2), (4) Date: May 11, 2012

(87) PCT Pub. No.: WO2011/061307
PCT Pub. Date: May 26, 2011

(65) Prior Publication Data
US 2012/0224944 A1    Sep. 6, 2012

(30) Foreign Application Priority Data

Nov. 20, 2009  (FR) ...................................... 09 58240

(51) Int. Cl.
*B23Q 1/00* (2006.01)
*B64F 5/00* (2006.01)
*B66F 7/06* (2006.01)
*B66F 9/06* (2006.01)

(52) U.S. Cl.
CPC ............... *B64F 5/0036* (2013.01); *B66F 7/065* (2013.01); *B66F 7/0625* (2013.01); *B66F 9/06* (2013.01)

(58) Field of Classification Search
USPC ........................................................... 269/46
See application file for complete search history.

(56) References Cited

U.S. PATENT DOCUMENTS

| 1,481,503 | A | * | 1/1924 | Carswell et al. ................ 269/61 |
| 1,600,835 | A | | 9/1926 | Manley |
| 1,812,585 | A | | 6/1931 | Collins |
| 2,712,874 | A | * | 7/1955 | Murray ......................... 414/743 |
| 2,763,053 | A | * | 9/1956 | Anderson ....................... 269/59 |
| 2,825,477 | A | | 3/1958 | Ross |

(Continued)

FOREIGN PATENT DOCUMENTS

| DE | 34 27 042 A1 | 2/1985 | |
| DE | 3427042 A1 * | 2/1985 | ................ B64F 5/00 |

(Continued)

OTHER PUBLICATIONS

International Search Report issued Dec. 29, 2010 in PCT/EP2010/067858 with English Translation.

(Continued)

*Primary Examiner* — Lee D Wilson
*Assistant Examiner* — Alvin Grant
(74) *Attorney, Agent, or Firm* — Oblon, McClelland, Maier & Neustadt, L.L.P.

(57) ABSTRACT

An aircraft engine module handling assembly including a carriage, a pivoting portion at a top of the carriage, a module support tooling, and an additional mechanism for assembly of the tooling on the pivoting portion, such that the module can be rotated from an original vertical position, observed when it reaches an assembly shop in a crate, to a horizontal position suitable for its assembly with another module of an engine.

7 Claims, 4 Drawing Sheets

(56) References Cited

U.S. PATENT DOCUMENTS

| | | | |
|---|---|---|---|
| 3,318,466 A * | 5/1967 | Baxley | 414/664 |
| 3,355,162 A * | 11/1967 | Kerr | 269/71 |
| 4,200,273 A | 4/1980 | Das Gupta et al. | |
| 4,412,774 A * | 11/1983 | Legrand et al. | 414/589 |
| 4,691,904 A | 9/1987 | Armstrong | |
| 5,816,367 A * | 10/1998 | Lilja et al. | 187/244 |
| 5,863,034 A | 1/1999 | Vauter | |
| 6,490,906 B1 * | 12/2002 | Bailey | 72/457 |
| 6,619,640 B1 * | 9/2003 | Ploski | 269/17 |
| 7,637,487 B2 * | 12/2009 | Muto | 269/55 |
| 7,770,292 B2 * | 8/2010 | Stretton | 29/889.1 |
| 7,963,542 B2 * | 6/2011 | Doll et al. | 280/404 |
| 8,118,291 B2 * | 2/2012 | Nuchter et al. | 269/71 |
| 8,621,873 B2 * | 1/2014 | Robertson et al. | 60/796 |
| 8,646,725 B2 * | 2/2014 | Lafont | 244/54 |
| 8,833,776 B2 * | 9/2014 | Boulanger et al. | 280/35 |
| 2009/0020934 A1 | 1/2009 | Metcalf et al. | |
| 2010/0155566 A1 * | 6/2010 | Linz | 248/554 |
| 2013/0256280 A1 | 10/2013 | Boulanger et al. | |

FOREIGN PATENT DOCUMENTS

| | | |
|---|---|---|
| DE | 200 23 688 U1 | 8/2005 |
| EP | 1 518 783 A1 | 3/2005 |
| FR | 868 161 A | 12/1941 |
| FR | 2 389 768 A1 | 12/1978 |

OTHER PUBLICATIONS

International Search Report issued Dec. 29, 2010 in PCT/EP2010/067857.

U.S. Appl. No. 13/510,764, filed May 18, 2012, Boulanger, et al.

* cited by examiner

AIRCRAFT ENGINE MODULE HANDLING ASSEMBLY

BACKGROUND OF THE INVENTION

1. Field of the Invention

The present invention relates to an aircraft engine handling assembly.

2. Description of the Related Art

Aircraft engines are firstly manufactured in separate modules, which are then assembled with one another. The manufactured modules are transported to the place of assembly, and then removed from their conditioning and moved precisely to the position in which they are docked with the adjacent module. The movements are essentially accomplished by handling, although plant such as hoists to raise the modules, and carriages to move them, are available.

This handling operation is long and difficult since aircraft engine modules are bulky and heavy items, whilst also being fragile. A particular difficulty derives from the fact that they are generally assembled with their rotational axis horizontal, whereas they are often positioned with the rotational axis vertical during shipment in their crate, in order that they are resting on a surface with a flat end, and in order that stability during shipment is improved: they must therefore be overturned when they have been removed from the crate, normally before being positioned on the carriage, but this operation is delicate and therefore requires many precautions. Placing the module on the carriage is also a delicate operation, and special brackets must be added to the module, called "lugs", to enable it to rest on it in stable fashion and with sufficient area, which would otherwise be impossible due to its generally conical and irregular rotational shape. It must be added that it is also necessary to use tools called "strongbacks", which are assembled at the ends of the module, in order to strengthen it whilst stopping the movements between the rotor and the stator before it is assembled with the other modules.

The invention relates to an assembly for handling an aircraft engine module which avoids the mentioned disadvantages, and allows the assembly of the module with an adjacent module to be prepared under optimum working conditions, more rapidly and with much fewer manual interventions, requiring fewer precautions.

DE-A-34 27 042 describes an aircraft engine handling assembly in which a moving carriage is fitted with means for attaching the module, and means for adjusting the position of the module, without reproducing other characteristics of the invention, and notably without creating an attachment through a tool secured to an end of the module, and providing the possibility of tipping the module completely. Other carriages or supporting devices are the subjects of U.S. Pat. Nos. 1,481,503, 1,600,835, US-A-2009/020 934 and U.S. Pat. No. 5,863,034.

BRIEF SUMMARY OF THE INVENTION

In its general form, the invention concerns an aircraft engine module handling assembly, including a moving carriage and tooling positioned at an end of the module, where the tooling includes a mount and devices for attachment to the module, and characterised in that the carriage includes an upper reinforcement structure set up on a module support frame, and pivoting around a horizontal axis, where the upper reinforcement structure and the tooling include additional devices for securing the module to the carriage in a position in which an axis of the module intersects the horizontal axis.

By this means the engine module is secured to the carriage through the tooling, which is advantageously a "strongback" appropriate for the invention: by this means the module is not deposited on the carriage directly or through a "lug", thereby reducing the risks of damage by impact or by excessive contact pressure. And the tipping of the module, which is required to change from the transport configuration with a vertical rotational axis to the assembly configuration with a horizontal rotational axis, is accomplished simply by the carriage, without any effort or particular precaution to prevent collisions or to adjust the alignment reached by the module.

An important element of the assembly relates to the lifting of the frame, in order to adjust the height of the module at the time when it is assembled. This is achieved by means of a device which can be independent from the carriage, and which then includes a fixed table in the location where the assembly might be accomplished. The carriage is lifted above the table, which raises it to the desired height, and the module remains securely attached to the carriage.

Assembly can be accomplished by releasing the module from the carriage, and by raising it by means of a hoist. The handling assembly can then be completed by a lifting arm which extends from one end to the other of the module, attached for example to the module by one end, and to the tooling by the other end, and fitted with attachment means which enable it to be raised at the centre of gravity of the module, which is therefore no longer subject to any risk of tipping.

BRIEF DESCRIPTION OF THE SEVERAL VIEWS OF THE DRAWINGS

The invention will now be described in greater detail by means of the figures, among which.

DETAILED DESCRIPTION OF THE INVENTION

Figure 1:
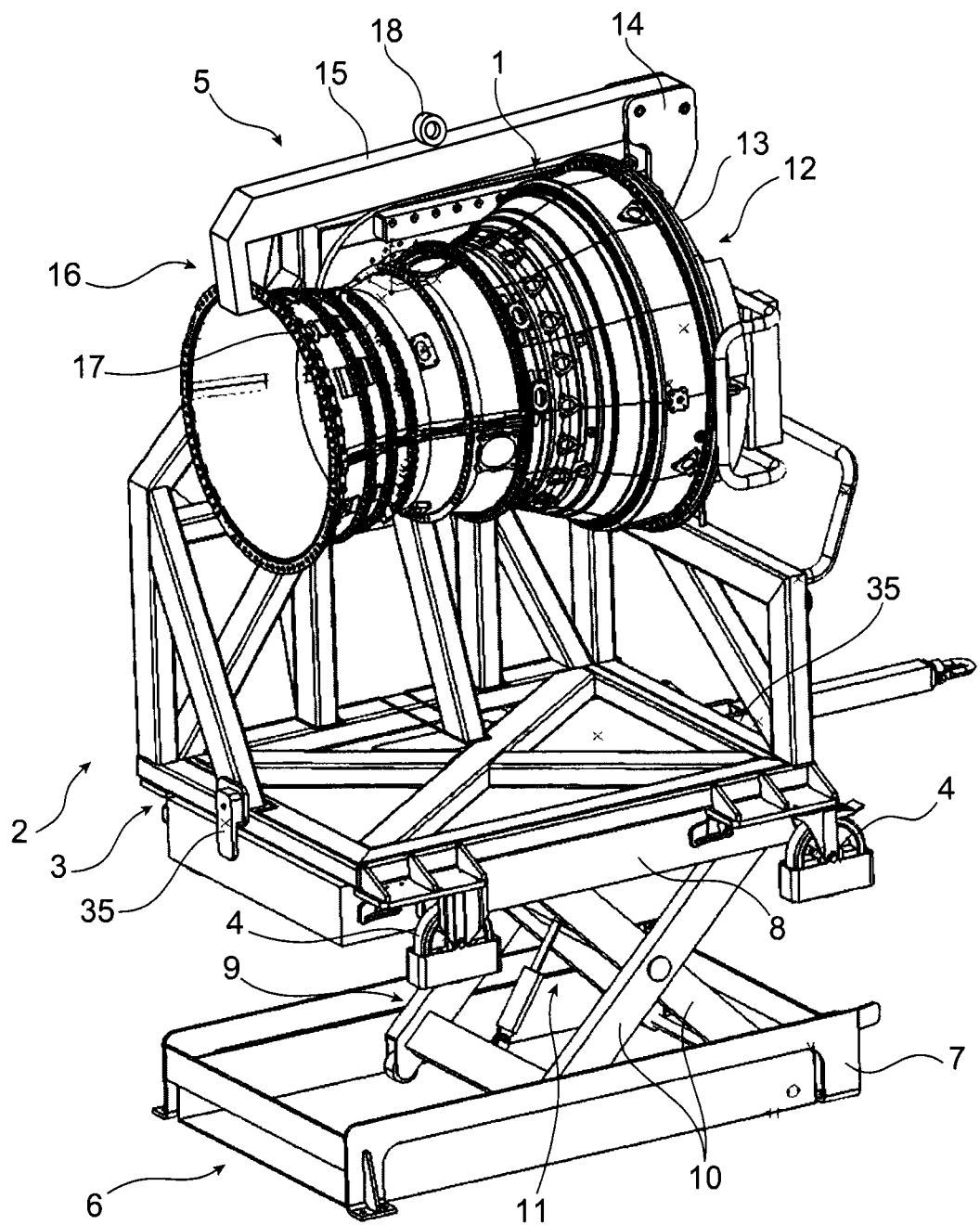
FIG. 1 represents the module assembled on the carriage.
Figure 2:
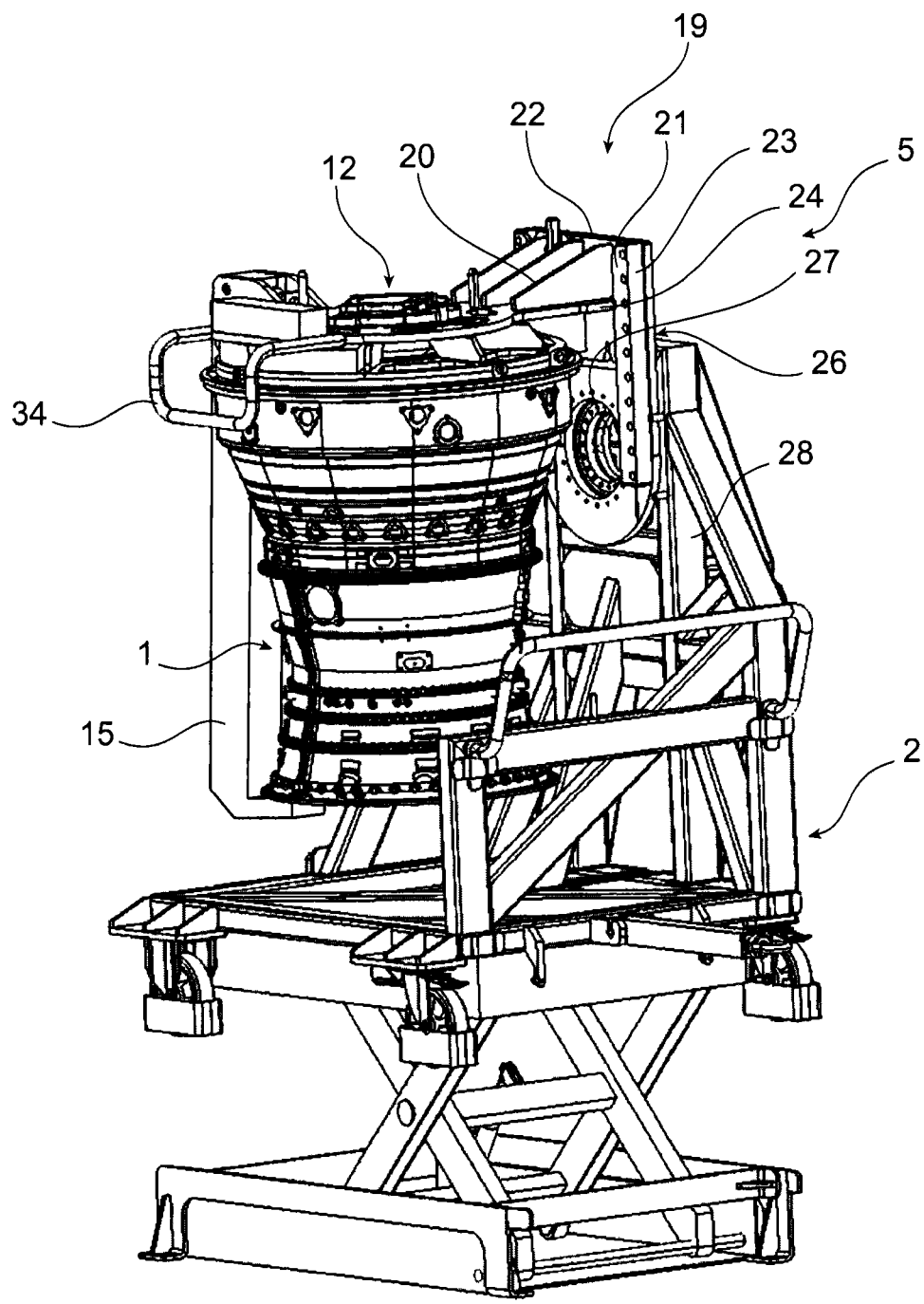
FIGS. 2 and 3 represent the module assembled on the carriage after tipping.
Figure 3:
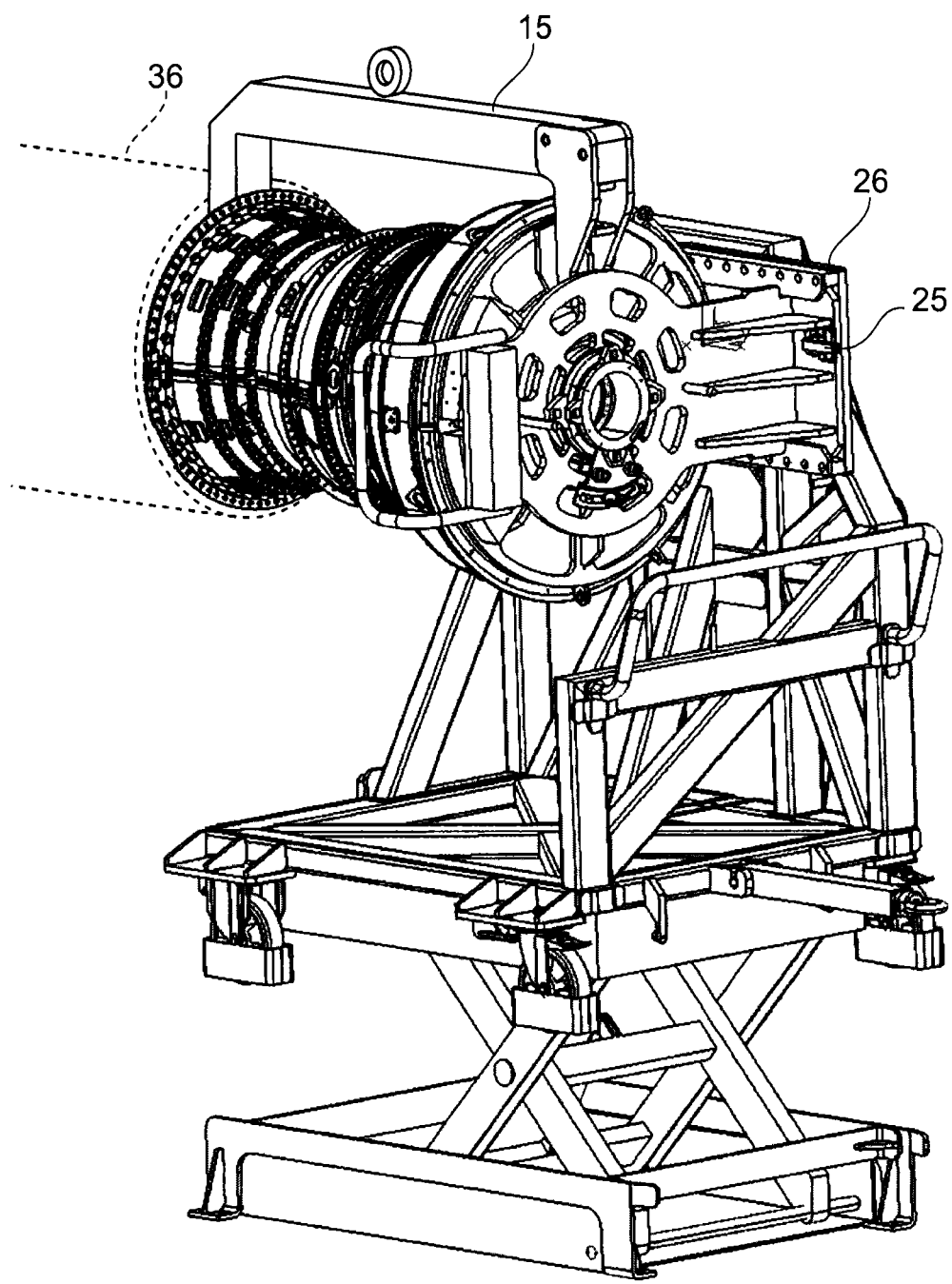

Aircraft engine module 1, which appears in this embodiment of the invention, is called the "core", or high-pressure body. This is a major intermediate module including the compressor and the high-pressure turbine, and the combustion chamber. As can be seen in FIGS. 1 to 3, it is assembled on a carriage 2 including a frame 3, rollers 4 installed on frame 3 and a reinforcement structure 5 rising from frame 3 and bearing module 1. Carriage 2 is however raised from the ground and borne by a lifting device 6 including a frame 7 and, above all, positioned in frame 7, an upper table 8 on which frame 3 of carriage 2 is installed, and a mechanism 9 with bars 10 connected by their middle, positioned between table 8 and the ground, and which raises this table when the angle of connection of bars 10 is modified by a jack 11. Another element of the assembly is tooling 12 taking the appearance of a cover attached to the rear of a cover 1: this is originally a "strongback", known in the art and principally including a mount 13 made from a plate covering the rear of module 1, to which it is bolted or attached by another manner by unrepresented devices, and which both enable it to be stiffened and enable module 1 to be protected, and means, not represented here as they are already known, borne by mount 13, to prevent sliding and rotating movements between the rotor and the stator of module 1. But tooling 12 is improved relative to known strongbacks: it includes an upper projection 14 to which a lifting arm 15 is attached, the other end 16 of which is attached to the front of module 1, and which bears in the centre an attachment ring 18. The attachments of the lifting arm are made by inserting a detachable pin 37 through projection 14, and by bolting to a flange 17 at the front of module 1.

Other details of the device are additional attachment means 19 between tooling 12 and carriage 2, which include a projection 20 positioned upright at the side of tooling 12, a skid 21 at the end of projection 20, which is square in shape, a groove 22, limited by overhanging edges 23, set up in a bracket 26 at the top of reinforcement structure 5, a stop 24 at the base of groove 22, and a screw 25 between skid 21 and bracket 26 of groove 22. Bracket 26 is fitted with a pivot 27 with a horizontal axis, assembled in reinforcement structure 5 and driven by a motor 28, enabling reinforcement structure 5 to rotate around this axis.

Figure 4:
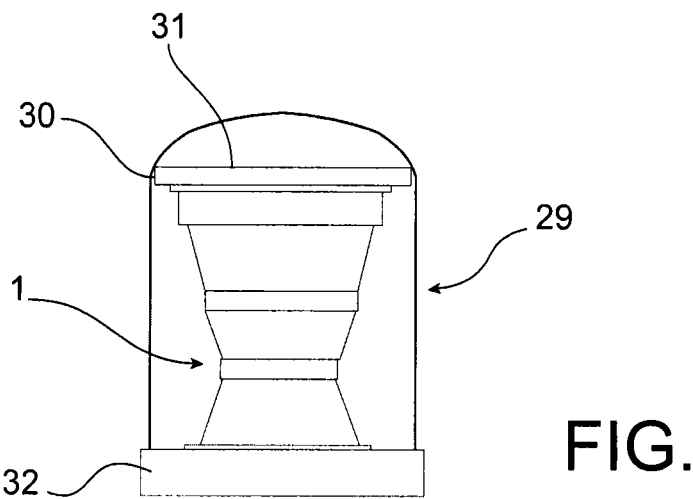
FIG. 4 illustrates the module at its arrival at the place of assembly, before the carriage is used.
Figure 5:
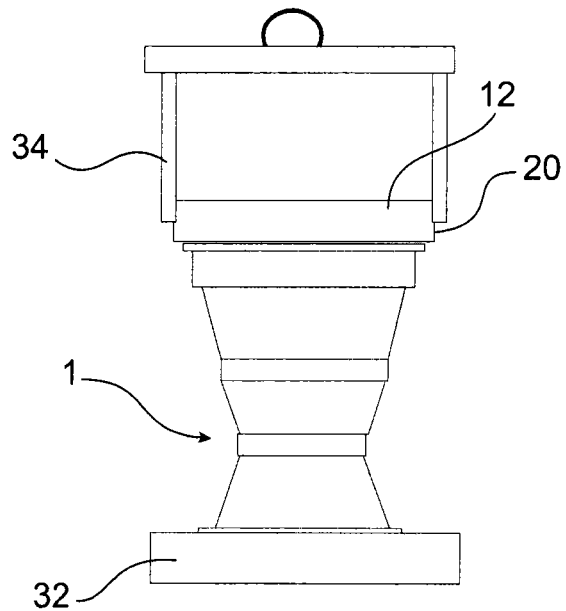
FIG. 5 illustrates the module just before being installed on the carriage.

The way in which module 1's handling occurs using the device described below is now described. FIG. 4 shows module 1 in its original configuration, enclosed in a crate 29, with its rotational axis vertical and the rear of module 1 pointing upwards. The first step consists in removing a cover 30 from crate 29, and a structure 31 designed to prevent module 1 from moving. When this is done, module 1, still resting on base 32 of crate 30, but released, receives tooling 12 which is attached to it, and tooling 12 is then suspended from a hoist 33, which is attached to projection 20, and to a handle 34 (represented in FIG. 2) protruding from the side opposite tooling 12. The state of FIG. 5 is obtained. Hoist 33 is raised by carrying tooling 12 and module 1 away; tooling with a protective cover can then also be positioned at the front of module 1 (at the other end from tooling 12), and module 1 is then installed on carriage 2. The tooling at the front (not represented) is a known type of "strongback" tooling, but it can be lighter and can be installed manually, due to the handling safety provided by the invention, which subjects module 1 to smaller forces. Installation on carriage 2 is accomplished, in the position of FIG. 1, by introducing skid 21 into groove 22, which is then also vertically aligned, by lowering module 1 until the skid 21 reaches stop 24, and then by securing screw 25. The next step is to rotate pivot 27, the axis of which intersects that of module 1, so as to obtain the state represented in FIG. 3, by tipping module 1, where its axis is then horizontal and the front of module 1 protruding from one side of carriage 2. Lifting arm 15 is installed at the top of the assembly, and projection 14 on which it is installed is then pointing upwards. Carriage 2 is then moved until it comes above table 8 of lifting device 6, then in its lower position and housed in frame 7; stops 35, which are retractable by pivoting, positioned at the front and rear of frame 3, are then lowered. Operating jack 11 causes table 8 to rise, and raises carriage 2 and module 1. An accidental fall of carriage 2 is prevented by stops 35 and by rollers 4, which surround table 8 on all sides. Hoist 33 can then take up module 1 by its arm using lifting arm 15, raise it from carriage 2 when assembly means 19 have been separated, and then move module 1 until it is docked with another module 36 of the engine, on to which it is to be assembled. Since ring 18 is positioned above the centre of gravity of module 1, there is no longer any risk of tipping.

Some of these operations can be accomplished in a different order: notably the rotation of module 1, the removal of hoist 33 and the raising of table 8. It should be noted that although a fixed raising device 6 close to the place of assembly of module 1 has been represented this is not necessary, and raising device 6 could have been incorporated in carriage 2.

The invention claimed is:

1. An aircraft engine module handling assembly, comprising:
   a moving carriage; and
   tooling positioned at an end of the module, wherein the tooling includes a mount and devices for attachment to the module;
   wherein the carriage includes an upper structure set up on a support frame, and a pivot for pivoting the upper structure with respect to the support frame around a horizontal axis, and
   wherein additional devices are provided on the upper structure and the tooling for securing the tooling to the upper structure in a position in which an axis of rotation of the module intersects the horizontal axis and can be pivoted from a vertical direction to a horizontal direction.

2. An aircraft engine module handling assembly according to claim 1, wherein the additional devices include a groove limited by overhanging edges, wherein a skid sliding in the groove and attached to a projection of the tooling extends out of the groove, with a stop of the skid in the groove and means of immobilizing the skid at the stop in the groove.

3. An aircraft engine module handling assembly according to claim 1, further comprising a device for raising the frame.

4. An aircraft engine module handling assembly according to claim 3, wherein the device for raising the frame includes a table independent of the carriage, and on which the carriage can roll, and wherein immobilizing stops are provided between the table and the carriage.

5. An aircraft engine module handling assembly according to claim 1, further comprising a lifting arm configured to be assembled at one end with the tooling and, at an opposite end, at a location of the module which is opposite the tooling.

6. An aircraft engine module handling assembly according to claim 1, wherein the pivot is driven by a motor.

7. An aircraft engine module handling assembly according to claim 2, wherein the groove is provided in a bracket disposed at a top of the upper structure, and the pivot is fitted in the bracket.

* * * * *